United States Patent
Lemaire

[15] 3,668,986
[45] June 13, 1972

[54] UNDERWATER IMAGING SYSTEM FOR DEEP SUBMERGENCE VEHICLES

[72] Inventor: Irov P. Lemaire, San Gabriel, Calif.
[73] Assignee: The United States of America as represented by the Secretary of the Navy
[22] Filed: May 25, 1970
[21] Appl. No.: 40,067

[52] U.S. Cl....................................95/11, 240/7.1, 240/26
[51] Int. Cl. .......................................................G03b 15/03
[58] Field of Search..................240/7.1, 26; 9/9; 43/17.6, 43/42.07; 114/16, 44; 116/27; 352/132; 95/11

[56] References Cited

UNITED STATES PATENTS

| 825,241 | 7/1906 | Pino | 350/49 |
| 2,598,698 | 6/1952 | Jensen | 95/125 X |
| 3,338,147 | 8/1967 | Goddard | 95/12.5 |

*Primary Examiner*—John M. Horan
*Attorney*—Richard S. Sciascia and Ervin F. Johnston

[57] ABSTRACT

An imaging system for a deep submergence vehicle comprising a light source; positioning means mounted on the vehicle for selectively extending and retracting the light source with respect to the vehicle; and a camera receiver mounted on the vehicle for viewing the area lighted by said light source.

4 Claims, 3 Drawing Figures

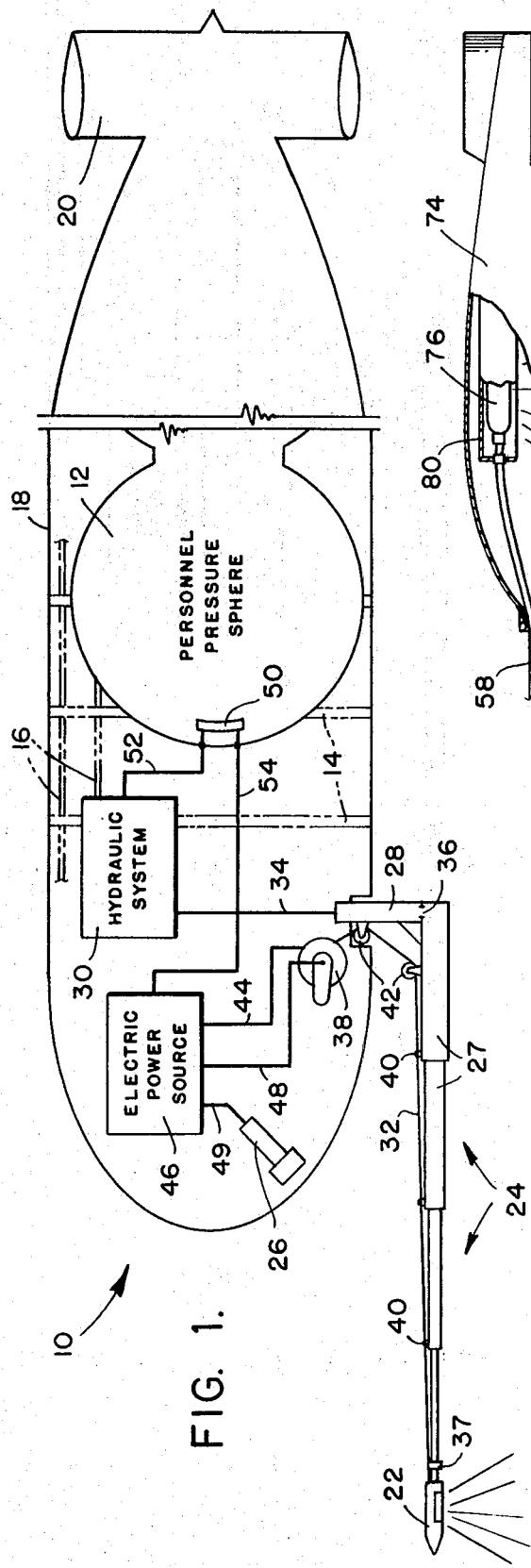
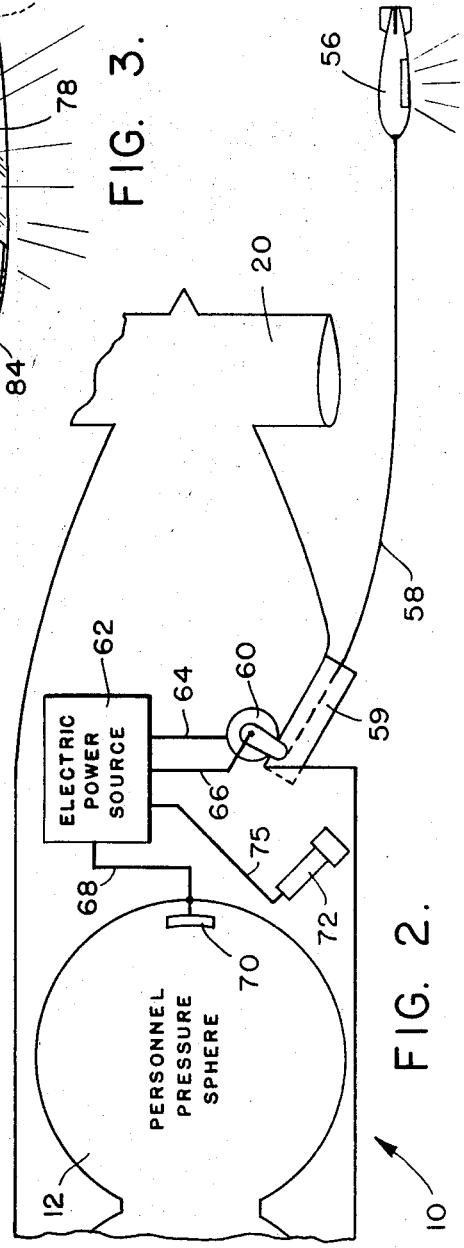
INVENTOR.
IVOR P. LEMAIRE
BY
ERVIN F. JOHNSTON
ATTORNEY.

UNDERWATER IMAGING SYSTEM FOR DEEP SUBMERGENCE VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many of the manned and unmanned vehicles are now being provided with underwater imaging capabilities for searching, mapping, and general observation. A typical imaging system includes a transmitter and receiver, which may include a light source and a television receiver respectively. Because of unwanted backscatter in the ocean waters, it is highly desirable that the transmitter and receiver be separated as far as possible. When the transmitter and receiver are close together the backscattering from the ocean environment is analogous to reflection of light transmitted in a fog. When a person wants to view an object in the fog the viewing is improved the more the light source is separated from the eyes toward the object to be viewed. Because of the size and shape constraints of underwater vehicles the transmitter and receiver are almost always mounted on the vehicle in close proximity with respect to one another. This results in a high degree of backscattering. The smaller the vehicle the more aggravated this problem becomes.

SUMMARY OF THE INVENTION

The present invention has overcome the problems associated with the prior art by providing an imaging system wherein the light source can be extended from the vehicle a desired distance. With this arrangement a vehicle mounted camera can view the area under consideration with a minimum of backscatter. In one embodiment of the invention the light source may be towed behind the vehicle by a cable which can be selectively reeled out or reeled in. In another embodiment of the invention the light source may be selectively extended or retracted forward of the nose of the vehicle. This second embodiment has a significant advantage over the towed embodiment since the area being viewed is in undisturbed waters forward of the vehicle.

STATEMENT OF THE OBJECTS OF INVENTION

An object of the present invention is to provide an imaging system for a deep submergence vehicle wherein the distance between the transmitter and receiver of the imaging system can be optimized.

Another object is to provide a light source and camera imaging system which minimizes backscattering in an ocean environment.

A further object is to provide an imaging system, for underwater vehicles, which has improved underwater imaging capabilities for searching, mapping, and general observation missions.

Other objects and many of the attendant advantages of this invention will be readily appreciated as it becomes better understood by reference to the description and accompanying drawings which follow.

BRIEF DESCRIPTION OF THE DRAWINGS

FIG. 1 is a side schematic illustration of a preferred embodiment of the present invention;

FIG. 2 is a side schematic illustration of another embodiment of the present invention; and FIG. 3 is a side view of a light source with portions cut away to illustrate various details thereof.

DESCRIPTION OF THE PREFERRED EMBODIMENT

Referring now to the drawing wherein like reference numerals designate like or similar parts throughout the several views there is shown in FIG. 1 a preferred imaging system mounted on a deep submergence vehicle 10. The vehicle may include a pressure sphere 12 for personnel, which is mounted within a framework of annular and longitudinal brace members 14 and 16 respectively. The components of the imaging system, described hereinbelow, may be mounted on these brace members and platforms therefrom, and for clarity purposes the particular mounting, whether it be bolt and nut combinations or welding, will not be described in detail. All of the area outside of the personnel pressure sphere 12 is at ambient pressure. About the frame members 14 and 16 is an exterior skin 18 which provides a desirable hydrodynamic exterior for the vehicle. The vehicle 10 may be propelled by propellers (not shown) within the shroud 20 at the aft end of the vehicle.

As illustrated in FIG. 1, the preferred imaging system may include a light source 22, positioning means 24 which is mounted on the vehicle 10 for selectively extending and retracting the light source 22 with respect to the vehicle, and a television receiver 26 which is mounted on the vehicle for viewing the area illuminated by the light source. The positioning means 24 may include a telescoping arm 27 which is mounted on the forward portion of the vehicle so that the arm can be extended and retracted in fore and aft directions respectively with respect to the vehicle. The telescoping arm 27 may be a series of hollow cylinders, with the exception of the outermost section which may be a rod, which are retractable within one another in piston-like fashion. The light source 22 is mounted to the outer end of the rod section of the telescope arm. The aftermost cylindrical section of the arm may be mounted to the vehicle by a vertical hollow cylinder 28 which also serves another function which will be described in detail hereinbelow.

In order to position the light source 22 at a desired distance from the receiver 26 a driving means is provided for extending and retracting the arm 27 in fore and aft directions respectively with respect to the vehicle. The telescoping arm 27 may be extended by hydraulic pressure from a hydraulic pressure source 30 and the arm may be retracted by a cable 32. Pressure from the hydraulic source may be fed to the top of the hollow cylinder 28 by a hydraulic line 34. The connection of the line 34 to the top of the cylinder 28 may be by any suitable means such as a hydraulic pressure fitting. The after cylindrical section of the telescoping arm 27 has an opening 36 into the hollow cylinder 28 so that when pressure is applied from the hydraulic system the arm will be extended in piston-like fashion.

One end of the cable 32 may be connected to the outer section of the telescoping arm by a clamp 37, and the other end of the cable is wound on a motor driven winch 38 which is mounted on the vehicle. Accordingly, when the winch 38 reels in the cable 32 the telescoping arm 27 is retracted to any desired position. The hydraulic fluid within the arm 27 is then bled back into the hydraulic pressure source 30, or may be bled from any section of the arm. In order to properly guide the cable 32, eyes 40 may be mounted on the top of the telescoping sections and pulleys 42 may be mounted on the after arm section and the vehicle. The winch 38 may include a self-contained motor which is powered by a lead 44 from an electric power source 46. Further, the cable 32 may include an electrical lead for delivering power to the light source 22. This electrical lead may be in contact with a center tap on the winch 38 which in turn is connected to the electrical power source by a lead 48. The power source 46 may also deliver power to the television camera 26 over lead 49. As illustrated in FIG. 1, the arm 27 is capable of telescoping the light source 22 forward of the forward end of the vehicle 10. This has a significant advantage in that the light source may be located ahead of the disturbed water due to movement of the vehicle.

In order to control the imaging system a control panel 50 may be mounted within the pressure sphere 12, and cables 52 and 54 may connect the hydraulic source 30 and the electric power source 46 respectively to this panel for control purposes. The cable 52 would carry a lead for actuating the hydraulic pressure source 30 to extend the telescoping arm 27, and the cable 54 would carry leads for activating the electric power source 22, receiver 26, and the winch 38. When the telescoping arm 27 is extended by the hydraulic pressure source the winch 28 may be free wheeling so that the cable 32 is extended therewith.

Referring to FIG. 2, there is shown another embodiment of the present invention. In this embodiment the light source 56 is towed aft of the vehicle 10 by a cable 58. The cable 58, which may be fed through a fairlead 59, is selectively reeled in or out by a winch 60 which is mounted on the vehicle. The winch 60 may include an electrical motor which is powered from an electrical power source 62 over line 64. Further, the cable 58 may include an electrical lead for powering the light source 56. This electric lead may be connected to a center tap at the winch 60 which is in turn connected by a lead 66 to the electric power source 62. A cable 68 may connect the electric power source 62 to a control panel 70 within the pressure sphere 12 so that the winch may be selectively utilized for reeling in or reeling out the cable 58. By this selective operation the light source 56 may be positioned at a desired separation from a television receiver 72 which may be mounted on the vehicle so as to view in an aft direction therefrom. The receiver 72 may receive electrical power from the source 62 over a lead 75.

As illustrated in FIG. 3, the light source 56 may include a pressure housing 74 in which there is mounted an electric light bulb 76. At the bottom of the housing 74 there may be a transparent opening 78, and light from the bulb 76 may be projected therethrough in a desired beam by a light reflector 80. The cable 58 may be pressure fitted through the nose of the housing 74 and may be connected within the housing to the bulb 76. The housing 74 may be shaped with a pointed nose and may have fins 82 for providing hydrodynamic stability as the light source is towed in the water. In order to maintain the beam of light in a downwardly projected direction the light source may be provided with a positive metacentric light. This may be accomplished by providing small lead weights 84 in the bottom of the housing on each side of the window 78. The light source 22 illustrated in FIG. 1 may be constructed similarly to the light source 56 in FIG. 3 except the fins 82 and the lead weights 84 would not be necessary.

In the operation of either embodiment the light source is extended or retracted to obtain a desired spacing between the light source and the receiver so that optimum illumination of the target area is obtained. This distance will vary according to the degree of backscattering and the type of bottom condition being viewed by the receiver.

Obviously many modifications and variations of the present invention are possible in the light of the above teachings. It is therefore to be understood that within the scope of the appended claims the invention may be practiced otherwise than as specifically described.

I claim:
1. An imaging system for a deep submergence vehicle comprising:
   a light source;
   a positioning means mounted on the vehicle for selectively extending and retracting the light source with respect to the vehicle;
   a camera receiver mounted on the vehicle for viewing the area lighted by said light source;
   the light source being contained within a housing which is hydrodynamically shaped for stability when moved by the vehicle in water;
   a transparent opening in the bottom of the housing, and a reflector mounted in the housing for reflecting the light downwardly through the opening; and
   said housing having a positive metacentric height for buoyantly positioning the transparent opening in the downward direction.
2. An imaging system as claimed in claim 1 comprising the positioning means including:
   a tow cable connected to the light source for towing the light source aft of the vehicle; and
   means mounted on the vehicle for winding in and letting out said tow cable.
3. An imaging system as claimed in claim 2 comprising:
   said tow cable including an electrical lead for powering the light source.
4. An imaging system for an elongated submarine-type deep submergence vehicle having fore and aft ends and capable of traveling in a path along its longitudinal axis comprising:
   a light source and a hydrodynamically shaped housing;
   said housing containing the light source and having a transparent opening for directing the light downwardly;
   a telescoping arm mounted on a forward portion of the vehicle for fore and aft movements along a path parallel to the vehicle's longitudinal axis, the forward movement extending forward of the fore end of the vehicle;
   said housing and the light source therein being mounted on the forward end of the telescoping arm with the light being directed downwardly; and
   a camera receiver mounted on the vehicle for viewing the area lighted by said light source.

* * * * *